UNITED STATES PATENT OFFICE.

GEORGE W. MOWRY, OF GENEVA, NEW YORK.

COMPOSITION FOR PRESERVING EGGS.

SPECIFICATION forming part of Letters Patent No. 259,038, dated June 6, 1882.

Application filed December 14, 1881. (No specimens.)

*To all whom it may concern:*

Be it known that I, GEORGE W. MOWRY, of Geneva, Ontario county, New York, have invented a certain new and useful Process for Preserving Eggs; and I do hereby declare that the following is a full, clear, and exact description of the same.

The common process of preserving eggs is to place them in common caustic lime or lime-water. When so treated the caustic principle of the lime eats into the shell of the egg and soon reaches the interior, which becomes tainted, and the eggs are spoiled or are injured thereby.
To obviate this difficulty my invention consists in the process of treating eggs which consists in packing the same in ordinary air-slaked lime treated with a mixture of water and muriatic or sulphuric acid, or other acid or acids which will neutralize the caustic principle of the lime, as hereinafter described.

In practicing my invention, take a quantity of common air-slaked lime reduced to a fine state, sufficiently to be easily stirred and mixed.
Take a quantity of water and mix with the same a small quantity of muriatic or sulphuric acid, or any other acid which will neutralize the caustic qualities of the lime. Sprinkle the mixed liquid upon the lime and stir the latter thoroughly till all parts of it have become moistened, but not reduced to a liquid or pasty form. This leaves the lime in the form of a dry material, which will pack closely and in a solid body. To pack the eggs a box, barrel, or other receptacle is used. The eggs are placed therein in layers or otherwise, the lime being placed all around them and packed down so that the eggs will not touch each other. The proportions found best for the purpose are two gallons of water and five ounces of acid, but may be varied more or less without affecting the result. The amount of lime may be more or less, as a greater or less amount of the liquid within certain bounds will have the effect of neutralizing the caustic principle of the lime. About two bushels of the slaked lime to the two gallons of liquid is a proper proportion. Enough of the liquid must be used to thoroughly wet the lime. The muriatic or sulphuric acid of commerce is employed for the purpose, the former having about the specific gravity of from 1.15 to 1.20 and the last 1.84 to 1.89.

By the treatment of the lime as above described the caustic qualities are neutralized, and when eggs are packed therein, as set forth, there is nothing in the lime to eat or destroy the shell, and it consequently will be preserved indefinitely, as well as the interior, and no taint will be imparted to the eggs.
The box or receptacle containing the packed eggs should be turned bottom upward and upon the sides not less than twice a week during the time of preserving to prevent the yelks from settling at the bottoms of the eggs.
The lime thus prepared can be used over and over again as long as desired.

Having thus described my invention, what I claim as new is—

A compound for preserving eggs, consisting in a weak solution of chloride of calcium mixed with air-slaked lime, the preparation being thoroughly dampened with water, substantially as set forth.

GEO. W. MOWRY.

Witnesses:
WM. HIGBIE,
HARRIET HIGBIE.